United States Patent
Nakamura

[19]

[11] Patent Number: 6,165,579

[45] Date of Patent: Dec. 26, 2000

[54] OPTICAL INFORMATION RECORDING MEDIUM AND RECORDING/ REPRODUCTION METHOD

[75] Inventor: Naomasa Nakamura, Yokohama, Japan

[73] Assignee: Kabushiki Kaisha Toshiba, Kawasaki, Japan

[21] Appl. No.: 09/185,974

[22] Filed: Nov. 5, 1998

[30] Foreign Application Priority Data

Nov. 6, 1997 [JP] Japan ................................ 9-304417

[51] Int. Cl.$^7$ ...................................................... B32B 3/02
[52] U.S. Cl. ...................... 428/64.1; 428/64.4; 428/64.5; 428/64.6; 428/457; 428/913; 430/270.13; 430/495.1; 430/945; 369/275.4; 369/283; 369/288
[58] Field of Search .................. 428/64.1, 64.2, 428/64.4, 64.5, 64.6, 457, 913; 430/270.13, 495.1, 945; 369/275.1, 275.4, 283, 288

[56] References Cited

U.S. PATENT DOCUMENTS 5,431,978  7/1995  Nakamura et al. .
5,978,349  11/1999  Yoshinari ............................ 369/275.1
6,042,921  11/1999  Yoshinari ............................... 428/64.1

OTHER PUBLICATIONS

Nishimura, et al., "High Density Recording Using Phase Change Optical Disk", SPIE, vol. 2415, (1995), pp. 319–327 (no month).

*Primary Examiner*—Elizabeth Evans
*Attorney, Agent, or Firm*—Pillsbury Madison & Sutro LLP

[57] ABSTRACT

Focusing and tracking can be stably performed using an optical information recording medium in which a high reflectivity and a large reflective change amount can be attained, and the reflectivity change amounts of the lands and grooves are set equal to each other by forming, between a transparent substrate and a first protective layer, an interference layer containing at least one material selected from the group consisting of Au, Ag, Cu, Si, and Ge. Even if information is recorded on the lands and the grooves, it can be recorded/reproduced without any crosstalk from an adjacent track.

16 Claims, 6 Drawing Sheets

OPTICAL INFORMATION RECORDING MEDIUM AND RECORDING/REPRODUCTION METHOD

BACKGROUND OF THE INVENTION

The present invention relates to an information recording medium for repeatedly recording/erasing information using a phase change recording layer in which the atomic alignment can be changed by irradiation of an electron beam or the like to change optical characteristics, and for recording/reproducing information by detecting changes in optical characteristics, and an information recording/reproduction method using this recording medium.

A recording erasable information recording medium has the following structure. FIG. 1 is a schematic sectional view showing the structure of an example of a conventional information recording medium. This information recording medium is constructed by a substrate 101, a first protective layer 102, a recording layer 103, a second protective layer 104, and a reflective layer 105 shown in FIG. 1. The substrate 101 is made of a glass or a plastic material (e.g., a polymethyl methacrylate resin or a polycarbonate resin), and the first and second protective layers 102 and 104 are made of ZnS, $SiO_2$, $Al_2O_3$, or a mixture of them. The recording layer 103 is made of a chalcogenide material such as GeSbTe. These layers can be formed by deposition methods such as vacuum deposition or sputtering. The reflective layer 105 is made of Al, Au, or an alloy containing Ti, Mo, Zr, or Cr and Al or Au as a base material.

Information can be recorded/erased as follows using this information recording medium. The entire surface of the information recording medium is irradiated and heated with a light beam to set the recording layer in a high crystallinity state (to be referred to as a crystalline state hereinafter), i.e., a state wherein atoms are relatively regularly aligned. To write or record information, the recording medium is irradiated with a short, strong pulse beam to heat, fuse, and quench the recording layer. Then, the pulse beam irradiated portion changes to a low crystallinity state (to be referred to as an amorphous state hereinafter), i.e., a state in which the atomic alignment is disturbed.

Since the crystalline state and the amorphous state are different in atomic alignment, optical characteristics, e.g., the transmittance and the reflectivity change to allow recording of information. Information written in this way can be erased by irradiating the recorded portion with a long, weak pulse beam, and heating and slowly cooling it at the melting point or less. This is because the recorded portion returns to the original crystalline state.

FIG. 2 is a view for explaining the laser power in recording during erase. As shown in FIG. 2, the above state can be realized by overwriting a new recorded portion using a laser power (recording power) prepared by superposing strong, short pulses on a weak continuous laser power (bias power), while erasing (crystallizing) a recorded portion (amorphous state) formed previously.

Since a practical recording medium uses a reflectivity change between the crystalline and amorphous states as a signal, the thicknesses of the respective layers are designed in consideration of optical interference at the interface between the protective layer and the recording layer and the interface between the protective layer and the reflective layer. These thicknesses are desirably optimized to attain a large optical reflectivity change in accordance with the optical constants of materials used in the medium.

FIG. 3 shows the calculation results for the amounts of change in the reflectivities and reflectivity of the recording (amorphous) state and the non-recording (crystalline) state with respect to the thickness of the second protective layer when, e.g., the recording layer is made of GeSbTe, the reflective layer is made of Al, and the protective layer is made of $ZnS:SiO_2$. In FIG. 3, graph 111 represents the reflectivity of a recorded portion; graph 112, the reflectivity of a non-recorded portion; and graph 113, the reflectivity change amount.

From these results, the thickness capable of attaining the maximum reflectivity change amount is about 100 Å to 200 Å or 1,400 Å to 1,500 Å. For the thickness of 100 Å to 200 Å, information is recorded in the direction in which the reflectivity decreases. For the thickness of 1,400 Å to 1,500 Å, information is recorded in the direction in which the reflectivity increases.

The two thicknesses can optically attain a large reflectivity change amount. However, an increase in thickness of the protective layer obstructs the flow of heat from the recording layer to the reflective layer, and modulation of the laser power cannot satisfactorily control quenching, degrading the recording characteristics (e.g., T. OHTA et al., JJAP VOL. 128 (1989), SUPPLEMENT 28-3, pp. 123–128). When a recording material such as GeSbTe is used for the recording layer, the thickness of the second protective layer is conventionally set at 100 Å to 200 Å, and information is recorded in the direction in which the reflectivity decreases.

Digital data recording methods using this optical disk include mark position recording and mark length recording. FIG. 4 is a schematic view showing an example of mark position recording, and FIG. 5 is a schematic view showing an example of mark length recording. As shown in FIG. 4, in mark position recording, recording marks 6 having the same shape are formed, and information can be obtained from the interval between the centers of the marks. As shown in FIG. 5, in mark length recording, information is recorded while changing the lengths of recording marks 7, and information can be obtained from the recorded mark length.

Conventionally, information is recorded on only either the grooves or lands formed in an optical disk. Recently, land/groove recording of recording information on both the lands and grooves is also proposed. FIGS. 6 and 7 are a perspective view and a plan view, respectively, showing an example of the state wherein information is recorded on both the lands and grooves. As shown in FIGS. 6 and 7, in this recording, recording marks 143 are formed on both lands 141 and grooves 142 by irradiating the optical disk with a recording beam 144.

As land/groove recording, e.g., N. Miyagawa et al., J.J. Appl. Phys. Vol. 32 (1993), pp. 5,324–5,328 discloses a method capable of reducing crosstalk from an adjacent track by forming a groove with a proper depth (about λ/6) in a phase change optical disk.

For a thickness suitable for conventional mark position recording, the recording area (amorphous region) on the disk is relatively smaller than the remaining non-recording (crystalline) region. In mark length recording, however, the recording area on the disk is larger than in mark position recording. For example, assuming the diameter of the recording mark to be 0.78 μm, the area ratio of the recording region to the non-recording region on the disk is 26% for mark position recording and 44% for mark length recording. If these recording methods are adopted for a conventional recording medium on which information is recorded in the direction in which the reflectivity decreases, the average reflectivity becomes lower upon reproduction than before recording as the area ratio of the recording region becomes higher.

In mark position recording, even if information is recorded in the direction in which the reflectivity decreases, a certain degree of reflected light quantity can be obtained, and the signal can be reproduced by focusing and tracking with a general optical disk drive. In mark position recording, however, when the interval between recording marks is decreased for a higher density, and information is recorded or reproduced, the area of the recording region with respect to the total area increases on the disk in which the reflectivity decreases upon recording. As a result, the average reflectivity becomes 60% or less the previous reflectivity. For example, using thickness A in FIG. 3 leads to an average reflectivity of 10% or less. This thickness cannot attain a reflected light quantity necessary for focusing and tracking because stable focusing and tracking generally require a reflectivity of at least 10%. To increase the reflectivity, the thickness of the protective layer must be increased, which obstructs maximization of the reflectivity change amount.

In the conventional structure in which the reflectivity decreases upon recording, if light is prevented from escaping from the lower surface of the reflective layer, the absorptivity is large at a recorded portion and small at a non-recorded portion. Since the absorptivity is different between a new mark overwritten on a recorded portion and a new mark overwritten on a non-recorded portion, the temperature rise upon recording becomes different between these portions. Further, since the crystalline non-recorded portion must be fused with latent heat, the temperature rise upon heating with the same laser power becomes more different. The size of the recording mark formed by fusion and quenching varies. For this reason, in the recording scheme of holding information at the edge of the recording mark, the edge position is fluctuated depending on the location.

To solve this problem, the following method is proposed. In the conventional layer structure (substrate/first protective layer/recording layer/second protective layer/reflective layer), a metal layer (Japanese Patent Application No. 5-221905) or a high-refractive-index layer (Japanese Patent Application No. 6-52494) is inserted between the substrate and the first protective layer. By using interference at the interface between the layers and interference from the substrate/metal layer or the high-refractive-index layer, a thickness structure of layers in which the reflectivity increases upon recording is employed instead of the conventional thickness structure of layers in which the reflectivity decreases upon recording.

In the disk having this structure, when data is recorded on the lands and grooves, the signal amplitudes become different between the lands and grooves due to the phase difference between the crystalline and amorphous recording materials, and the phase difference caused by the depth difference between the lands and grooves.

Moreover, recording information on the lands and grooves thermally influences an adjacent track. In recording, information of the adjacent track is erased.

BRIEF SUMMARY OF THE INVENTION

The present invention has been made in consideration of the above situation, and has as its object to provide an optical information recording medium in which the edge position is not fluctuated regardless of the location, the reflectivity increases upon recording, a large reflectivity change amount can be attained, and the reflectivity change amounts of the lands and grooves are made close to each other.

It is another object of the present invention to provide a recording/reproduction method using the optical information recording medium in which the edge position is not fluctuated regardless of the location, the reflectivity is sufficiently high, a large reflectivity change amount can be attained, and the reflectivity change amounts of the lands and grooves are set close to each other, which method can stably perform focusing and tracking and can be satisfactorily applied to mark length recording and overwrite recording without erasing information of an adjacent track and generating any crosstalk from an adjacent track even when high-density recording is performed on the lands and grooves.

According to the first aspect of the present invention, there is provided an optical information recording medium having a structure obtained by sequentially stacking a transparent substrate, an interference layer containing at least one material selected from the group consisting of Au, Ag, Cu, Si, and Ge, a first protective layer, a phase change recording layer in which irradiation of a recording light beam changes atomic alignment to change optical characteristics, a second protective layer, and a reflective layer.

According to the second aspect of the present invention, there is provided a method of recording/reproducing optical information, comprising recording marks having different lengths on grooves and lands and reproducing recorded information by irradiation of a recording light beam to an optical information recording medium having a structure obtained by sequentially stacking a transparent substrate having spiral or concentrical tracks made up of grooves and lands between the grooves, an interference layer containing at least one material selected from the group consisting of Au, Ag, Cu, Si, and Ge, a first protective layer, a phase change recording layer in which irradiation of a recording light beam changes atomic alignment to change optical characteristics, a second protective layer, and a reflective layer.

Since the reflectivity upon recording can be increased by using the optical information recording medium of the present invention, a sufficient quantity of reflected light can be obtained even upon mark length recording, and focusing and tracking can be stably performed.

According to the present invention, an optical information recording medium in which the edge position is not fluctuated regardless of the location, the reflectivity increases upon recording, a large reflectivity change amount can be attained, and the reflectivity change amounts of the lands and grooves are close to each other can be obtained.

According to the optical information recording/reproduction method of the present invention, by using the recording medium in which the edge position is not fluctuated regardless of the location, the reflectivity is sufficiently high, a large reflectivity change amount can be attained, and the reflectivity change amounts of the lands and grooves are close to each other, focusing and tracking can be stably performed, and mark length recording and overwrite recording can be satisfactorily performed without any crosstalk from an adjacent track even when high-density recording is performed on the lands and the grooves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
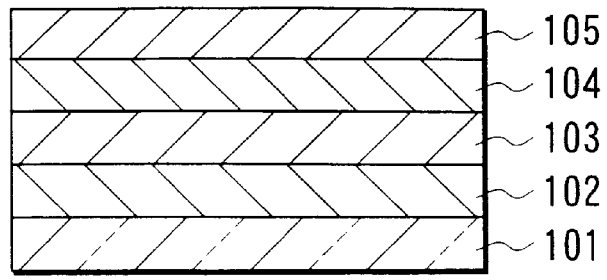
FIG. 1 is a schematic sectional view showing the structure of an example of a conventional information recording medium.
Figure 2:
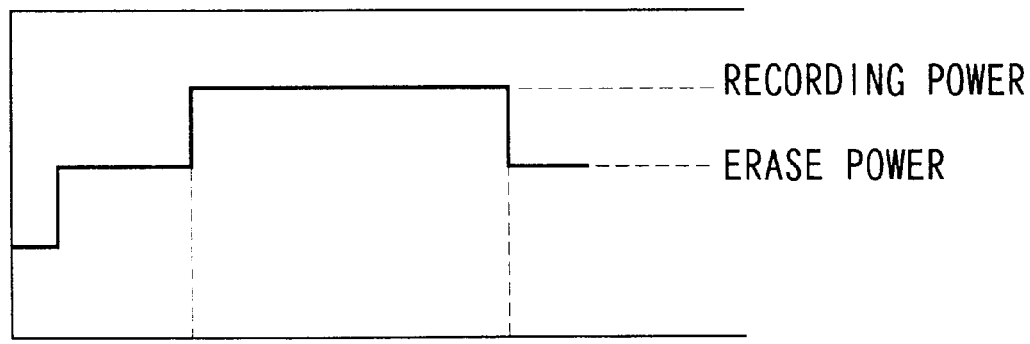
FIG. 2 is a view for explaining the laser power in recording during erase.
Figure 3:
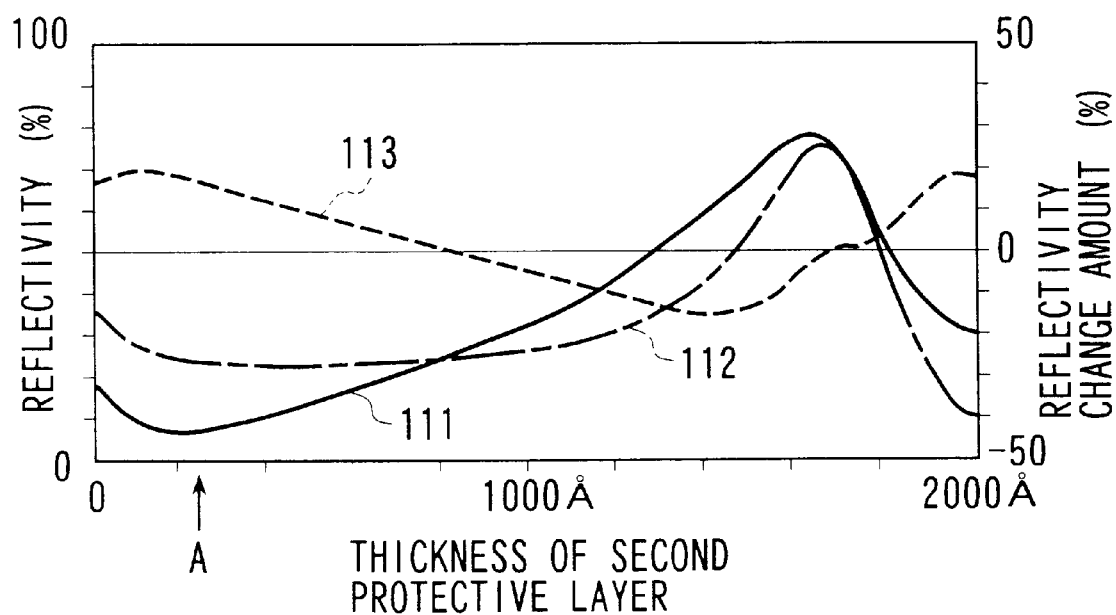
FIG. 3 is a graph showing the relationship between the thickness of the second protective layer and the reflectivities and reflectivity change amounts of the recording and non-recording states in a conventional information recording medium.
Figure 4:
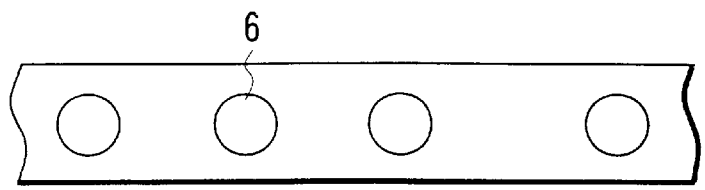
FIG. 4 is a schematic view showing an example of mark position recording.
Figure 5:
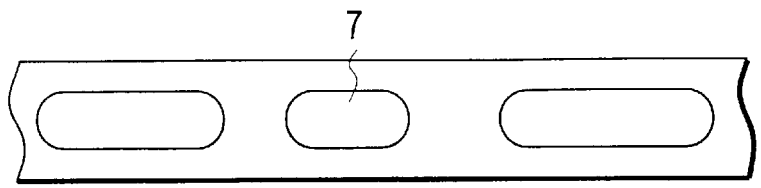
FIG. 5 is a schematic view showing an example of mark length recording.
Figure 6:
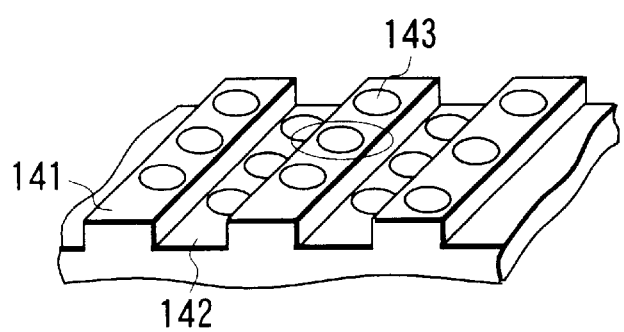
FIG. 6 is a perspective view for explaining an example of land/groove recording.
Figure 7:
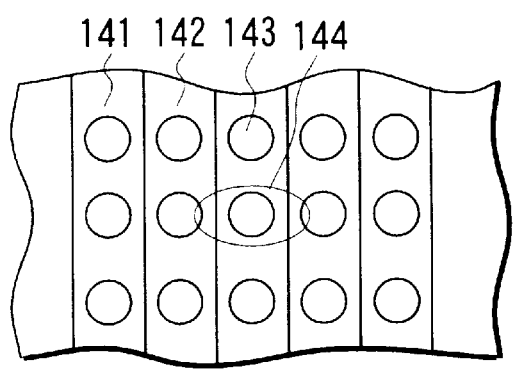
FIG. 7 is a plan view for explaining an example of land/groove recording.

An optical information recording medium according to the present invention has a structure obtained by sequentially stacking a transparent substrate, an interference layer containing at least one material selected from the group consisting of Au, Ag, Cu, Si, and Ge, a first protective layer, a phase change recording layer in which irradiation of a recording light beam changes atomic alignment to change optical characteristics, a second protective layer, and a reflective layer.

According to the present invention, e.g., a metal or high-refractive-index layer containing at least one material selected from the group consisting of Au, Ag, Cu, Si, and Ge is inserted between the substrate and the first protective layer. This realizes an optical information recording medium in which the reflectivity upon recording is increased by interference of the substrate and the metal or high-refractive-index layer in addition to interference at the interface between the respective layers.

The first and second protective layers are made of preferably at least one material selected from the group consisting of nitrides, oxides, sulfides, and fluorides of silicon, aluminum, zinc, magnesium, germanium, and titanium, and more preferably zinc sulfide and silicon dioxide.

The reflective layer is preferably made of an Al-containing alloy.

The phase change recording layer preferably has a thickness of 350 Å or less.

The thicknesses of the phase change recording layer and first and second protective layers forming the optical information recording medium of the present invention are desirably set to attain a maximum reflectivity change amount of 2 to 100% and more preferably about 10 to 100% upon variously changing these layers.

For example, when the interference layer contains at least one material selected from the group consisting of Au, Ag, and Cu, the interference layer has a thickness of 200 Å or less and preferably 30 Å to 200 Å, the first protective layer has a thickness of 0.2 to 0.45 ($\lambda/n$) and preferably 0.27 to 0.32 ($\lambda/n$), note that in this case $\lambda$ is a wavelength when recording and n is refractive index of a protective layer, the phase change recording layer has a thickness of 350 Å or less and preferably 50 Å to 350 Å and is essentially made of GeSbTe, the second protective layer has a thickness of 0.04 to 0.4 ($\lambda/n$) or 0.52 to 0.92 ($\lambda/n$) and is essentially made of ZnS:SiO$_2$, and the reflective layer has a thickness of 100 Å or more and preferably 500 Å to 5,000 Å and is essentially made of an Al alloy.

For example, when the interference layer contains at least one of Si and Ge, the interference layer has a thickness of 400 Å to 750 Å, the first protective layer has a thickness of 0.3 to 0.5 ($\lambda/n$) and preferably 0.35 to 0.40 ($\lambda/n$), the phase change recording layer has a thickness of 350 Å or less and preferably 50 Å to 350 Å and is substantially made of GeSbTe, the second protective layer has a thickness of 0.04 to 0.4 ($\lambda/n$) or 0.52 to 0.92 ($\lambda/n$) and is substantially made of ZnS:SiO$_2$, and the reflective layer is substantially made of an Al alloy.

When the interference layer contains at least one material selected from the group consisting of Au, Ag, and Cu or one of Si and Ge, a high reflectivity and a large reflectivity change amount can be attained by selecting the materials and thicknesses of the respective layers. The edge position does not fluctuate depending on the location, and crosstalk from an adjacent track can be reliably prevented even upon recording on the lands and the grooves.

The optical information recording medium of the present invention has spiral or concentrical tracks made up of grooves having a depth of 0.14 to 0.2 $\lambda/n$ or 0.25 to 0.4 $\lambda/n$, note that in the case $\lambda$ is a wavelength when recording, n is the refractive index of a substrate and lands between the grooves, the thicknesses of the interference layer and first protective layer are adjusted to make the reflectivity change amounts of the lands and grooves close to each other, and phase-changed and phase-unchanged portions have a phase difference of ±45° or less and preferably ±20° or less.

Since the groove is made deeper than the conventional one to cut off thermal diffusion, an erasure by heat from an adjacent track can be prevented. If the thickness is selected to obtain a phase difference of ±45° or less between crystalline and amorphous states, the reflectivity change amounts of the land and groove can be made close or equal to each other. For a phase difference of ±20° or less, they can be made much closer.

The present invention also provides a recording/reproduction method using the above optical information recording medium. According to this method, recording marks having different lengths are recorded on grooves and lands, and recorded information is reproduced by irradiation of a recording light beam using an optical information recording medium having a structure obtained by sequentially stacking a transparent substrate having spiral or concentrical tracks made up of grooves and lands between the grooves, an interference layer containing at least one material selected from the group consisting of Au, Ag, Cu, Si, and Ge, a first protective layer, a phase change recording layer in which irradiation of a recording light beam changes atomic alignment to change optical characteristics, a second protective layer, and a reflective layer.

In the recording/reproduction method of the present invention, a metal or high-refractive-index layer containing at least one material selected from the group consisting of Au, Ag, Cu, Si, and Ge is inserted between the substrate and first protective layer of a used optical information recording medium. This can increase the reflectivity upon recording by interference of the substrate and the metal or high-refractive-index layer in addition to interference at the interface between the respective layers. The present invention can therefore provide a recording/reproduction method suitable for overwrite recording in which a high reflectivity and a large reflectivity change amount can be attained, and crosstalk from an adjacent track can be prevented even upon recording on both the grooves and the lands.

The materials and thicknesses of layers such as the interference layer, the first and second protective layers, the recording layer, and the reflective layer forming the optical information recording medium used in the recording/reproduction method of the present invention can be set to be the same preferable materials and preferable ranges of the above-mentioned optical information recording medium according to the present invention.

The present invention will be described in more detail below with reference to the several views of the accompanying drawing.

Figure 8:
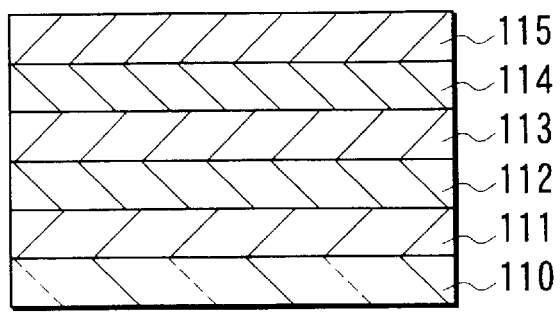
FIG. 8 is a view showing an example of the structure of an optical information recording medium according to the present invention.

FIG. 8 is a view showing an example of the structure of an optical information recording medium according to the present invention. As shown in FIG. 8, an interference layer 111, a first protective layer 112, a recording layer 113, a second protective layer 114, and a reflective layer 115 are stacked on a transparent substrate 110. The transparent substrate 110 is made of a glass or a plastic material (e.g., a polymethyl methacrylate resin or a polycarbonate resin), and the interference layer is made of Au, Ag, Cu, Si, Ge, or an alloy containing them as a main component. The first and second protective layers are made of ZnS, $SiO_2$, $Al_2O_3$, or a mixture of them. The recording layer 113 is made of a chalcogenide material such as GeSbTe. These layers can be formed by deposition methods such as vacuum deposition or sputtering. The reflective layer 115 is made of Al, an Au substance, or an alloy containing Ti, Mo, Zr, or Cr and Al or Au as a base material. Since the reflective layer 115 functions to reflect light and effectively dissipate heat generated in the recording layer, its thickness is desirably 100 Å or more.

Figure 9:
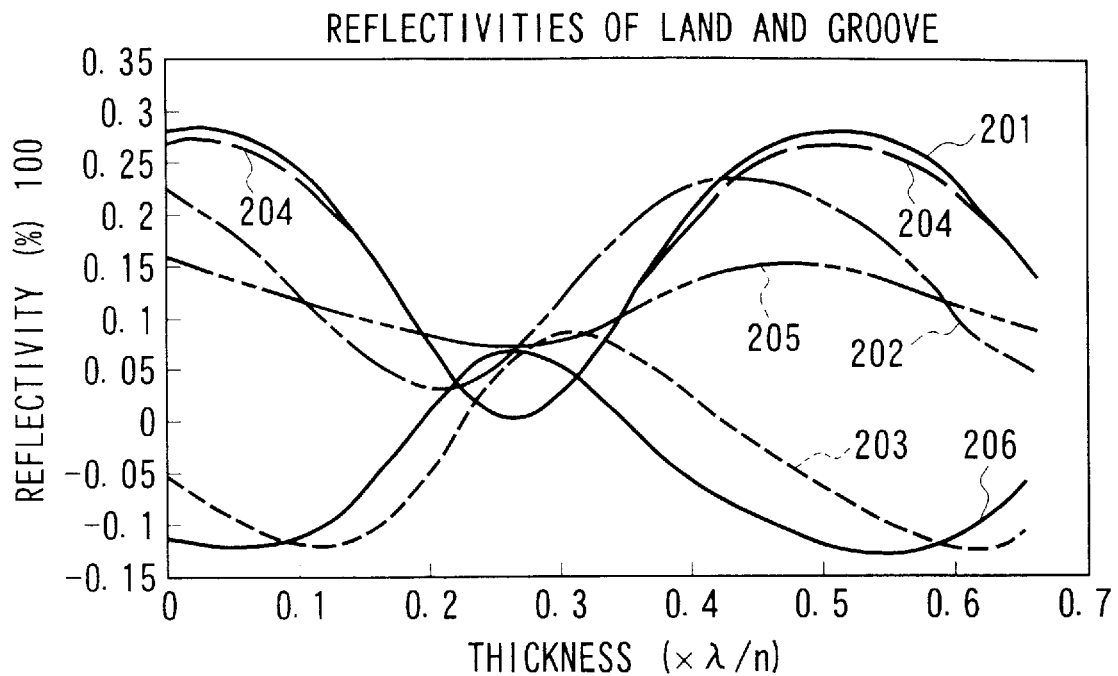
FIG. 9 is a graph showing the relationship between the thickness of the first protective layer and the reflectivities and reflectivity change amounts of recorded and non-recorded portions in one example of the optical information recording medium of the present invention.

FIG. 9 is a graph showing the relationship between the thickness of the first protective layer and the reflectivities and reflectivity change amounts of recorded and non-recorded portions in an optical information recording medium having a structure using an Au interference layer like the one shown in FIG. 8. In FIG. 9, graph 201 represents the reflectivity of a crystalline portion of a groove; graph 202, the reflectivity of an amorphous portion of a groove; graph 203, the reflectivity change amount of a groove; graph 204, the reflectivity of a crystalline portion of a land; graph 205, the reflectivity of an amorphous portion of a land; and graph 206, the reflectivity change amount of a land. The wavelength of light used for measurement was 640 nm. The interference layer was made of Au with a thickness of 120 Å, the recording layer was made of GeSbTe with a thickness of 100 Å, the second protective layer was formed with a thickness of 300 Å, and the reflective layer was made of Al with a thickness of 2,000 Å. As the substrate, a polycarbonate transparent substrate having a land/groove width of 0.6 μm and a groove depth of 0.08 μm.

As shown in FIG. 9, since light entering from the substrate side is multiple-reflected by the respective layer interfaces, the reflectivity change is different depending on the thickness, as indicated by graphs 201, 202, 204 and 205.

In FIG. 9, when the thickness of the first protective layer falls within the range of 0.2 to 0.45 ($\lambda/n$), the reflectivity change is positive, that is reflectivity of amorphous portion is more than that of crystalline portion. As for the reflectivity change amounts of the lands and grooves, a maximum reflectivity change amount of 0.27 ($\lambda/n$) is obtained at the lands, as indicated by graph 206, and a maximum reflectivity change amount of 0.32 ($\lambda/n$) is obtained at the grooves, as indicated by graph 203. When the thickness of the first protective layer is 0.28 ($\lambda/n$), the reflectivity change amounts of the lands and grooves become equal to each other. Therefore, the thickness of the first protective layer in recording on the lands and the grooves is preferably about 0.27 to 0.32 ($\lambda/n$) around 0.28 ($\lambda/n$).

Figure 10:
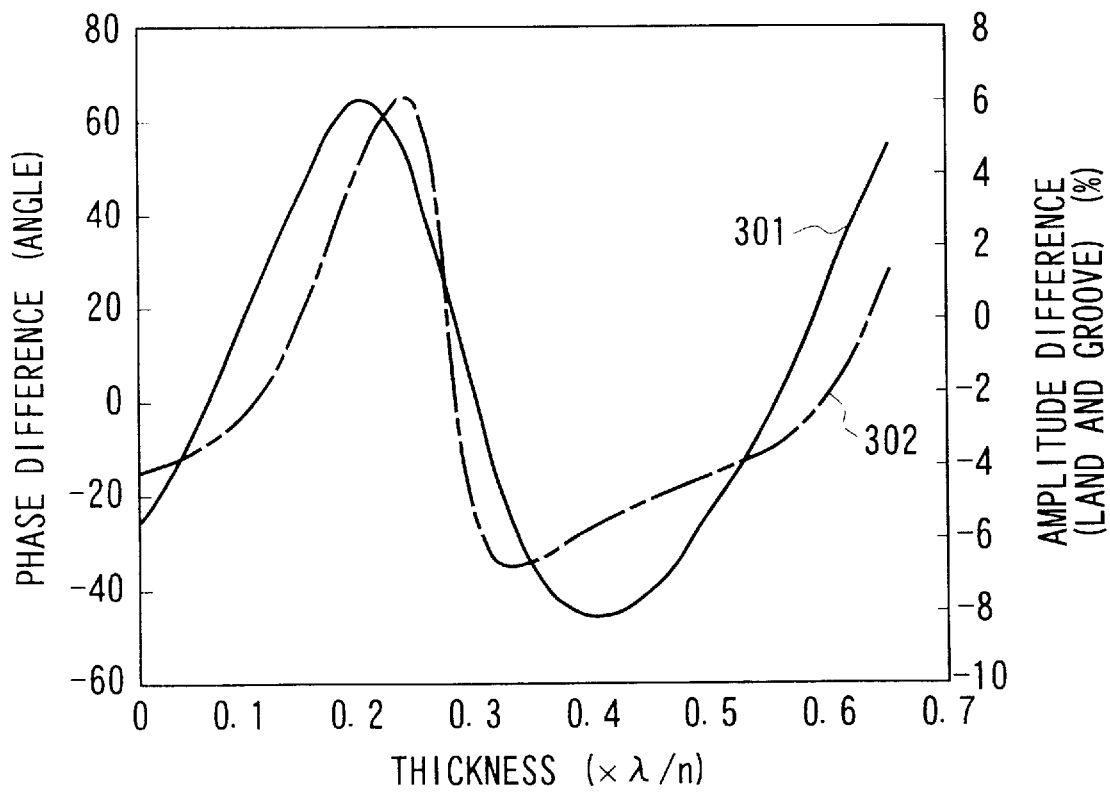
FIG. 10 is a graph showing the relationship between the thickness of the first protective layer, the amplitude difference between the lands and the grooves, and the phase difference between the crystalline and amorphous portions in the optical information recording medium of the present invention.

FIG. 10 is a graph showing the relationship between the thickness of the first protective layer, the amplitude difference between the lands and the grooves, and the phase difference between crystalline and amorphous portions. In FIG. 10, graph 301 represents the relationship between the thickness of the first protective layer and the amplitude difference between the lands and the grooves; and graph 302, the relationship between the thickness of the first protective layer and the phase difference between crystalline and amorphous portions. As is apparent from graphs 301 and 302, the amplitude difference between the lands and the grooves is almost 0 for a thickness with which the phase difference is almost 0. The phase difference is preferably ±45° or less.

Figure 11:
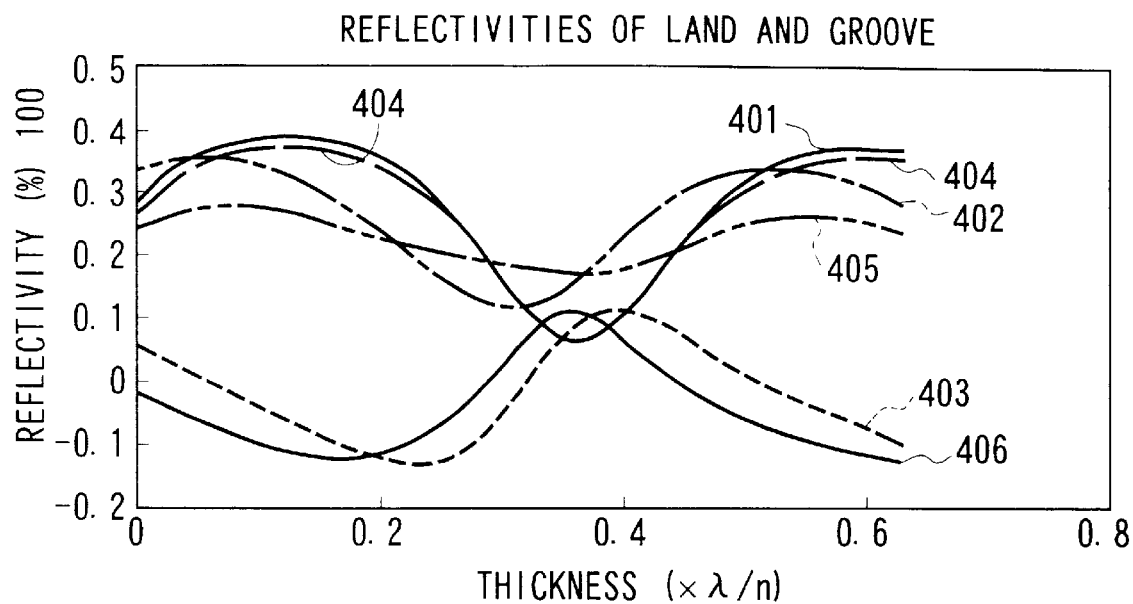
FIG. 11 is a graph showing the relationship between the thickness of the first protective layer and the reflectivities and reflectivity change amounts of recorded and non-recorded portions in another example of the optical information recording medium of the present invention.

FIG. 11 is a graph showing the relationship between the thickness of the first protective layer and the reflectivities and reflectivity change amounts of recorded and non-recorded portions in an optical information recording medium having a structure using an Si interference layer like the one shown in FIG. 8. In FIG. 11, graph 401 represents the reflectivity of a crystalline portion of a groove; graph 402, the reflectivity of an amorphous portion of a groove; graph 403, the reflectivity change amount of a groove; graph 404, the reflectivity of a crystalline portion of a land; graph 405, the reflectivity of an amorphous portion of a land; and graph 406, the reflectivity change amount of a land. As shown in FIG. 11, as the thickness of the first protective layer increases within the range of 0.3 ($\lambda$/n) to 0.5 ($\lambda$/n), the reflectivity increases upon recording. This is because interference appears in this thickness range. As for the reflectivity change amounts of the lands and grooves, a maximum reflectivity change amount of 0.36 ($\lambda$/n) is obtained at the lands, and a maximum reflectivity change amount of 0.39 ($\lambda$/n) is obtained at the grooves. The reflectivity change amounts of the lands and grooves become equal at 0.37 ($\lambda$/n). As a result, a large reflectivity change amount can be obtained. The thickness of the first protective layer enough to obtain the same amplitude at the lands and the grooves is preferably 0.35 to 0.40 ($\lambda$/n).

When Au or Si is used as a material for the interference layer, the optimum thickness is 0.27 to 0.32 ($\lambda$/n) for Au and 0.35 to 0.40 ($\lambda$/n) for Si.

The complex refractive index of Si is 3.9 to 0.2i for a wavelength of 640 nm. The material usable for the interference layer is not limited to Si as far as the material has the same complex refractive index. For example, a Ge-containing alloy exhibits nearly the same optical characteristics. The complex refractive index of Au is 0.067 to 3.494i, but the material is not limited to Au so long as the material has the same complex refractive index, similar to Si. For example, an alloy containing Cu or Ag exhibits nearly the same optical characteristics.

Figure 12:
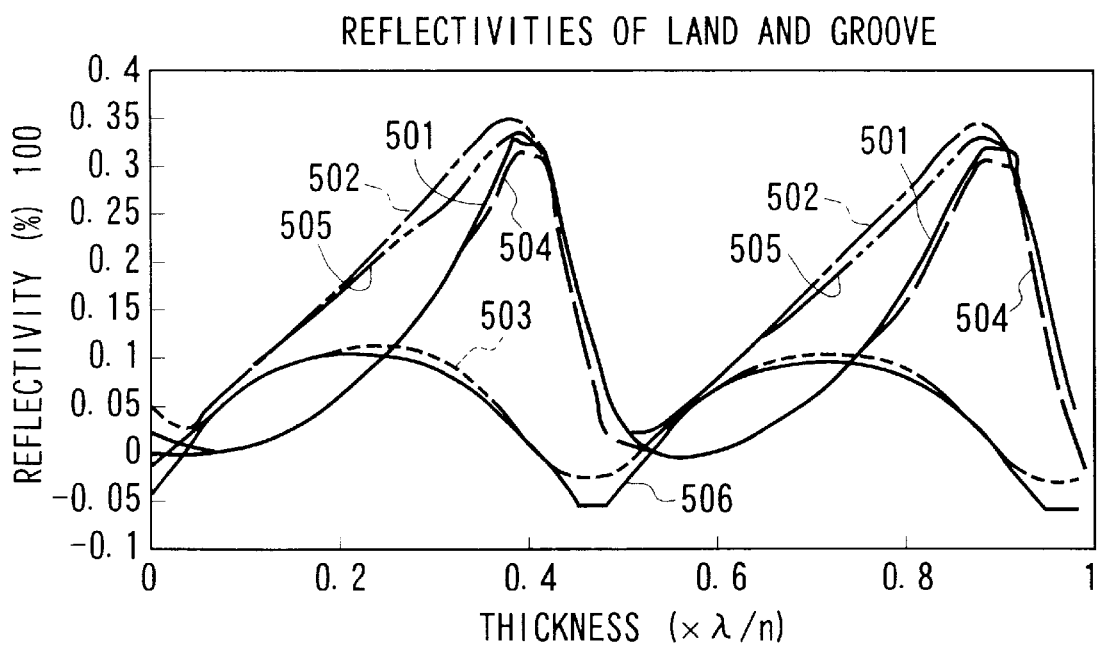
FIG. 12 is a graph showing the relationship between the thickness of the second protective layer and the reflectivities and reflectivity change amounts of recorded and non-recorded portions in one example of the optical information recording medium of the present invention.
Figure 13:
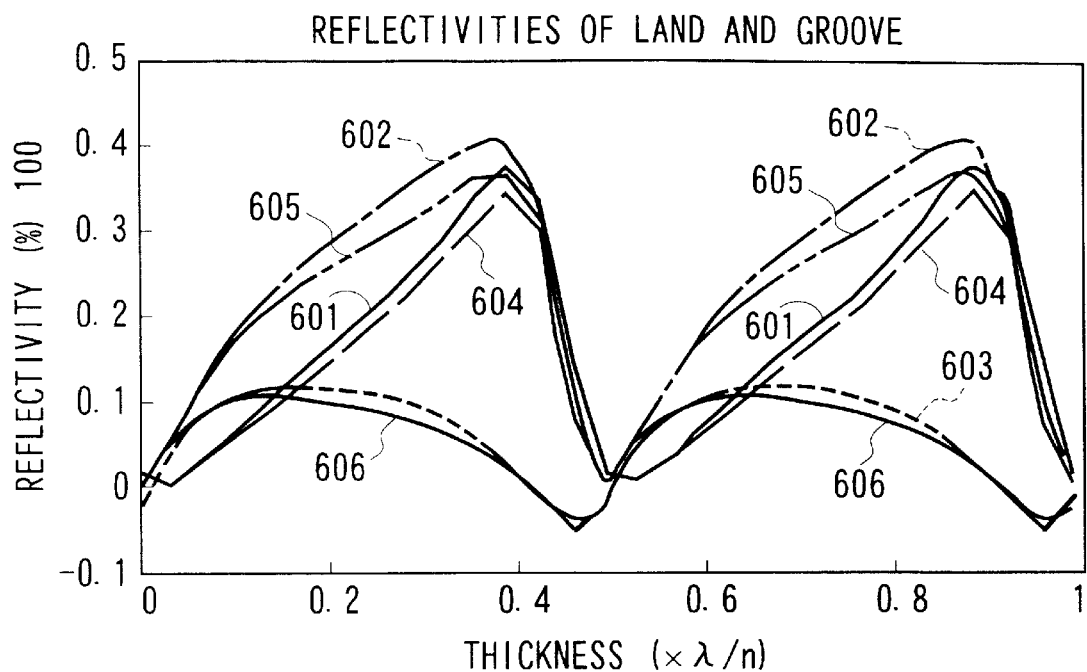
FIG. 13 is a graph showing the relationship between the thickness of the second protective layer and the reflectivities and reflectivity change amounts of recorded and non-recorded portions in another example of the optical information recording medium of the present invention.

FIG. 12 is a graph showing the relationship between the thickness of the second protective layer and the reflectivities and reflectivity change amounts of recorded and non-recorded portions in an optical information recording medium having a structure using an Au interference layer like the one shown in FIG. 8. FIG. 13 is a graph showing the relationship between the thickness of the second protective layer and the reflectivities and reflectivity change amounts of recorded and non-recorded portions in an optical information recording medium having a structure using an Si interference layer like the one shown in FIG. 8. In FIGS. 12 and 13, graphs 501 and 601 represent the reflectivity of a crystalline portion of a groove; graphs 502 and 602, the reflectivity of an amorphous portion of a groove; graphs 503 and 603, the reflectivity change amount of a groove; graphs 504 and 604, the reflectivity of a crystalline portion of a land; graphs 505 and 605, the reflectivity of an amorphous portion of a land; and graphs 506 and 606, the reflectivity change amount of a land.

As shown in FIGS. 12 and 13, such a reflectivity change amount as to increase the reflectivity upon recording is obtained in almost the whole region with respect to the thickness of the second protective layer. If the thickness of the second protective layer falls within the range of 0.04 to 0.4 ($\lambda$/n) or 0.52 to 0.92 ($\lambda$/n), the reflectivity change amount is obtained. According to the present invention, a sufficient reflectivity change amount can be obtained even with a thin second protective layer. This allows control of quenching by modulation of the laser power.

FIGS. 12 and 13 show the calculation results for a wavelength of 640 nm. If another wavelength applicable to recording is used, the thicknesses of the respective layers are properly changed to optimum ones. The optimum thicknesses of the respective layers change depending on the groove shape formed to track the substrate with a light beam. It also lies within the spirit and scope of the present invention to change the thicknesses of the respective layers so as to increase the reflectivity upon recording in accordance with various conditions such as the groove shape and the wavelength of the recording light.

FIG. 8 exemplifies as the recording medium of the present invention a single-side recording/reproduction recording medium having one interference layer, one first protective layer, one recording layer, and one reflective layer. Instead, the present invention can employ a two-side recording/reproduction recording medium obtained by laminating the reflective layers of two recording media each having the above structure.

Figure 14:
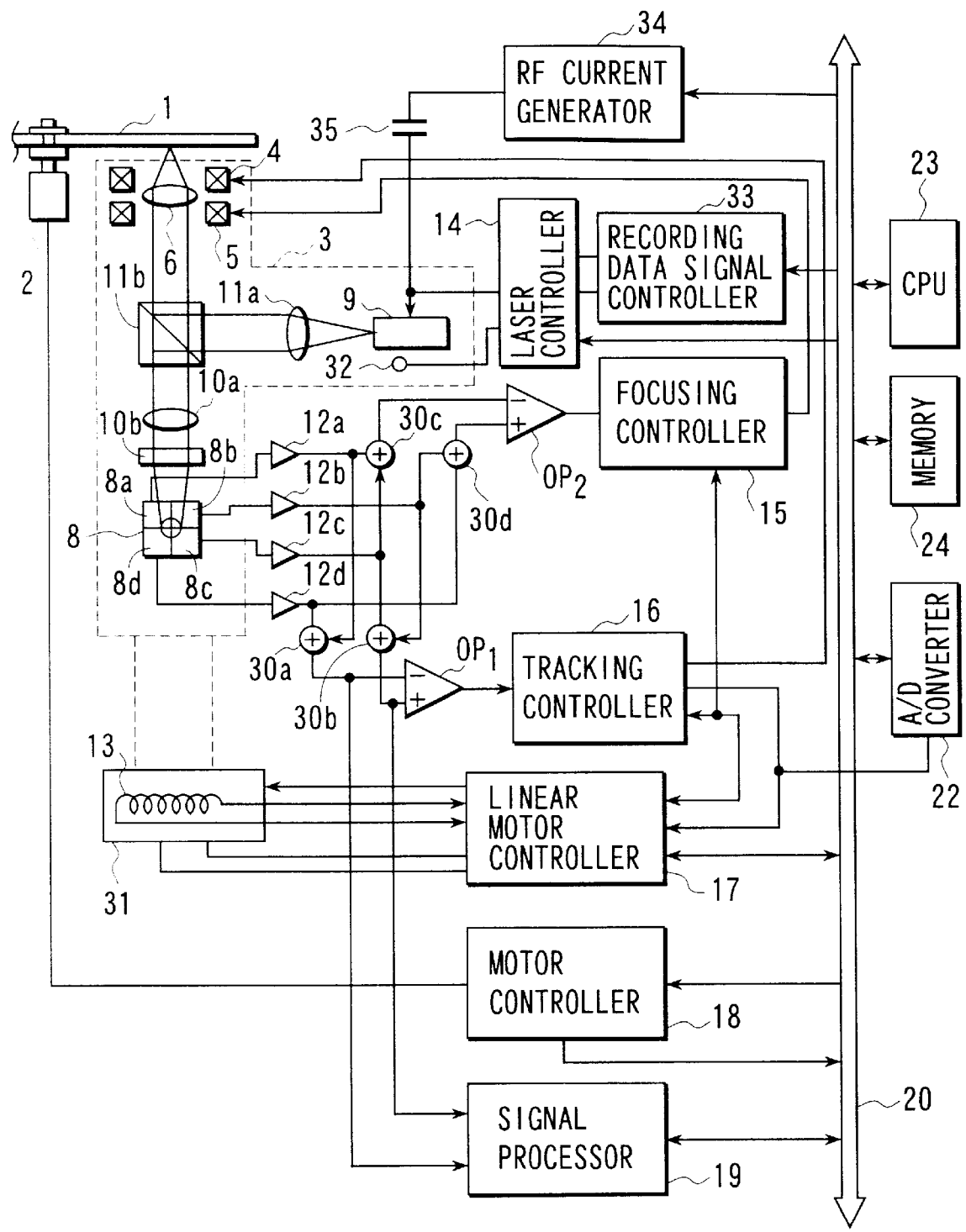
FIG. 14 is a block diagram showing an example of a recording/reproduction apparatus to which the optical recording medium of the present invention can be applied.

A recording/reproduction apparatus to which the optical information recording medium of the present invention can be applied will be described. FIG. 14 is a block diagram showing an example of the recording/reproduction apparatus to which the optical information recording medium of the present invention can be applied. As shown in FIG. 14, grooves (recording tracks) are spirally or concentrically formed in the surface of an optical disk (information recording medium) 1, and the optical disk 1 is rotated by a motor 2 at, e.g., a predetermined speed. The motor 2 is controlled by a motor controller 18.

Information is recorded/reproduced on/from the optical disk 1 by an optical head 3. The optical head 3 is fixed to a driving coil 13 building the movable portion of a linear motor 31, and the driving coil 13 is connected to a linear motor controller 17. A permanent magnet (not shown) is arranged at the stationary portion of the linear motor 31. The driving coil 13 is excited by the linear motor controller 17 to move the optical head 3 along the radius of the optical disk 1 at an approximately constant speed.

The optical head 3 holds an objective 6 with a wire or leaf spring (not shown). The objective 6 is moved by a driving coil 5 in the focusing direction (direction of the optical axis of the lens) and by a driving coil 4 in the tracking direction (direction perpendicular to the optical axis of the lens).

A laser beam generated by a laser diode (semiconductor laser diode) 9 driven by a laser controller 14 irradiates the optical disk 1 via a collimator lens 11a, a half prism 11b, and the objective 6. The reflected beam by the optical disk 1 is guided to a photodetector 8 via the objective 6, the half prism 11b, a condenser lens 10a, and a cylindrical lens 10b.

The photodetector 8 is made up of four divided photodetection cells 8a, 8b, 8c, and 8d.

An output signal from the photodetection cell 8a of the photodetector 8 is supplied to one terminal of each of adders 30a and 30c via an amplifier 12a. An output signal from the photodetection cell 8b is supplied to one terminal of each of adders 30b and 30d via an amplifier 12b. An output signal from the photodetection cell 8c is supplied to the other terminal of each of the adders 30b and 30c via an amplifier 12c. An output signal from the photodetection cell 8d is supplied to the other terminal of each of the adders 30a and 30d via an amplifier 12d.

An output from the adder 30a is supplied to the inverting input terminal of a differential amplifier OP1, whereas an output from the adder 30b is supplied to the non-inverting input terminal of the differential amplifier OP1. The differential amplifier OP1 supplies a track difference signal to a tracking controller 16 in accordance with the difference between the adders 30a and 30b. The tracking controller 16 generates a track drive signal in accordance with the track difference signal supplied from the differential amplifier OP1.

The track drive signal output from the tracking controller 16 is supplied to the driving coil 4 in the tracking direction. The track difference signal used in the tracking controller 16 is supplied to a linear motor controller 17.

The linear motor controller 17 applies a voltage corresponding to the moving speed to the driving coil (conductor) 13 inside the linear motor 31 (to be described later) in accordance with the track difference signal from the tracking controller 16 and a movement control signal from a CPU 23.

The linear motor controller 17 comprises a speed sensor (not shown) for sensing the relative speed of the driving coil 13 with respect to a magnetic member (not shown), i.e., the moving speed of the linear motor 31 using electrical changes inside the driving coil 13 which take place when the driving coil 13 inside the linear motor 31 (to be described later) crosses a magnetic flux generated by the magnetic member.

An output from the adder 30c is supplied to the inverting input terminal of a differential amplifier OP2, whereas an output from the adder 30d is supplied to the non-inverting input terminal of the differential amplifier OP2. The differential amplifier OP2 supplies a signal about the focal point to a focusing controller 15 in accordance with the difference between outputs from the adders 30c and 30d. An output signal from the focusing controller 15 is supplied to the focusing driving coil 5 to control the laser beam to be always in focus on the optical disk 1.

The sum signals of outputs from the photodetection cells 8a to 8d of the photodetector 8 upon focusing and tracking, i.e., output signals from adders 30a and 30b reflect changes in reflectivity from pits (recording information) formed on tracks. The signals are supplied to a signal processor 19. The signal processor 19 reproduces recording information and address information (track number, sector number, and the like).

The laser beam output from the laser diode 9 is monitored by a photodiode 32 and converted into an electrical signal. The electrical signal is fed back to the laser controller 14 to stabilize the laser beam output from the laser diode 9. The laser controller 14 receives a laser beam ON/OFF signal and recording data signal from a recording data signal controller 33 using a microprocessor and the like. A driving current output from the laser controller 14 is superposed on an RF current (to be described later) from an RF current generator 34 via a coupling capacitor 35.

The optical disk apparatus comprises a D/A converter 22 used to exchange information between the focusing controller 15, the tracking controller 16, the linear motor controller 17, and the CPU 23.

The tracking controller 16 moves the objective 6 in accordance with a track jump signal supplied from the CPU 23 via the D/A converter 22, and moves the beam by one track.

The CPU 23 controls via a bus line 20 the laser controller 14, the focusing controller 15, the tracking controller 16, the linear motor controller 17, the motor controller 18, the signal processor 19, the recording data signal controller 33, the RF current generator 34, and the like. The CPU 23 performs predetermined operation in accordance with a program stored in a memory 24.

The optical information recording medium of the above recording/reproduction apparatus was formed by vacuum-sputtering Si (600 Å)/ZnS:SiO$_2$ (0.39 ($\lambda$/n)=1,200 Å)/GeSbTe (atomic composition ratio=2:2:5) (300 Å)/ZnS:SiO$_2$ (300 Å)/Al (1,000 Å) on a grooved polycarbonate disk 90 mm in diameter and 0.6 mm in thickness. This recording medium was crystallized using an argon laser in advance and set on the recording/reproduction apparatus. While the spindle motor was rotated, a signal was recorded. The rotation rate was 1,800 rpm. The recording signal was a single signal having such a recording frequency as to attain the shortest mark length of 0.6 $\mu$m. Focusing and tracking could be stably performed before and after recording. The reflectivity of the non-recorded portion was 11%, and the reflectivity of the recorded portion was 35%. The recorded signal was measured with a spectrum analyzer to obtain a CNR (signal to noise ratio) of 55 dB at both the lands and the grooves.

In mark length recording, the portions of the rising edge and falling edge of the waveform of the reproduced signal corresponding to the recording mark is detected as a signal. In other words, the length of the mark of each signal and an interval between spaces are compared with reference clocks (T) so that the number of clocks (T) which are inserted in the length of the mark and the space interval is detected to output a signal.

A circuit for generating digital data from a detection signal will be explained. A signal from a detector is current/voltage-converted. The voltage is amplified to one necessary for digitalization. A preprocessor detects only the AC component. This signal is sent to a comparator, compared with a slice level, and converted into digital data. The slice level is detected by smoothing the signal, and fed back so as to always slice near the center of the signal amplitude.

Figure 15:
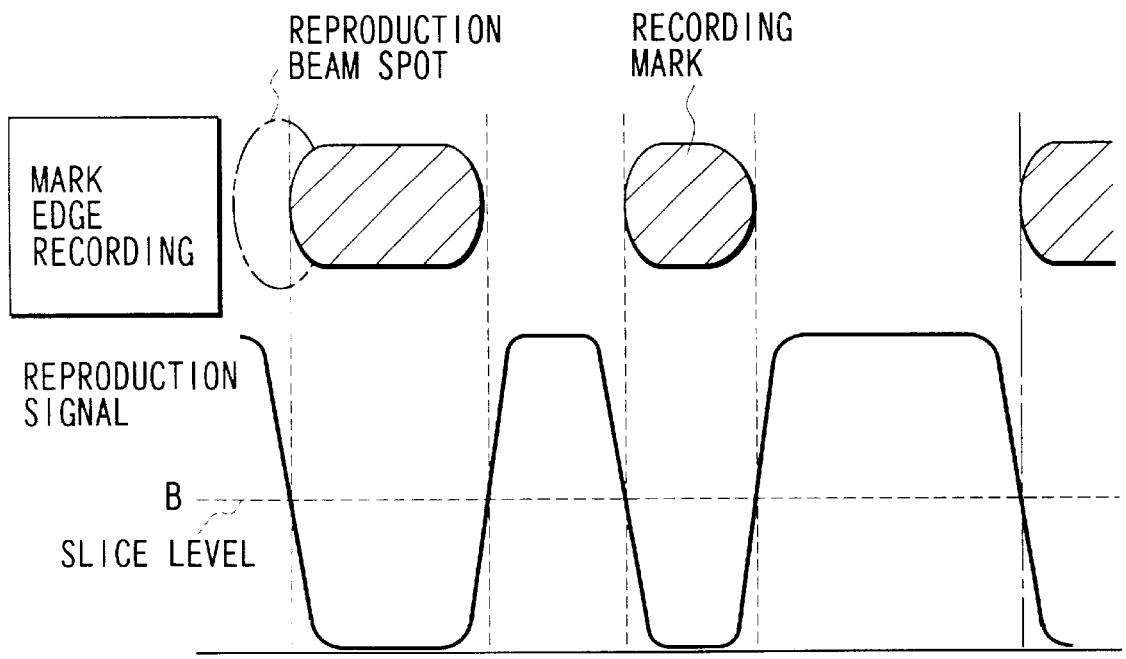
FIG. 15 is a graph showing an example of a detection signal in a recording/reproduction method for the optical recording medium of the present invention.

FIG. 15 shows the reproduced signal at this time. The slice level of digital data is set at the middle point (B in FIG. 15) of the signal amplitude, and compared with the signal to generate digital data. When a random digital signal RLL (1,7) was actually recorded, and the reproduced signal was compared with data of the signal used for recording, the reproduced signal completely coincided with the data to confirm satisfactory recording/reproduction of the code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording medium comprising:
   a transparent substrate;
   an interference layer containing at least one material selected from the group consisting of gold, silver, cooper, silicon, and germanium;
   a first protective layer formed on said interference layer;
   a phase change recording layer formed on said first protective layer, having optical characteristics changeable due to change in atomic alignment by irradiation of a recording light beam;
   a second protective layer formed on said phase change recording layer; and
   a reflective layer formed on said second protective layer, wherein said transparent substrate has spiral or concentrical tracks made up of grooves having a depth of 0.14 to 0.2 $\lambda$/n or 0.25 to 0.4 $\lambda$/n and lands between the grooves, thickness of said interference layer and said first protective layer are adjusted to make reflectivity change amounts of the lands and the grooves close to each other, and a phase-changed portion and a phase-unchanged portion have a phase difference not more than ±45°.

2. A medium according to claim 1, wherein the phase difference is not more than ±20°.

3. A medium according to claim 1, wherein said interference layer contains at least one material selected from the group consisting of gold, silver, and copper and has a thickness not more than 200 Å, said first protective layer has a thickness of 0.2 to 0.45 ($\lambda$/n), said phase change recording layer is essentially made of GeSbTe and has a thickness not more than 350 Å, said second protective layer is essentially made of zinc sulfide and silicon dioxide and has a thickness of 0.04 to 0.4 ($\lambda$/n) or 0.52 to 0.92 ($\lambda$/n), and said reflective layer is essentially made of an alloy containing at least one of aluminum and gold and has a thickness not less than 100 Å.

4. A medium according to claim 3, wherein said first protective layer has a thickness of 0.27 to 0.32 ($\lambda$/n).

5. A medium according to claim 1, wherein said interference layer contains at least one of silicon and germanium and has a thickness of 400 Å to 750 Å, said first protective layer has a thickness of 0.3 to 0.5 ($\lambda$/n), said phase change recording layer is essentially made of GeSbTe and has a thickness not more than 350 Å, said second protective layer is essentially made of zinc sulfide and silicon dioxide and has a thickness of 0.04 to 0.4 ($\lambda$/n) or 0.52 to 0.92 ($\lambda$/n), and said reflective layer is essentially made of an alloy containing at least one of aluminum and gold and has a thickness not less than 100 Å.

6. A medium according to claim 5, wherein said first protective layer has a thickness of 0.35 to 0.40 ($\lambda$/n).

7. A medium according to claim 1, wherein said first protective layer is made of at least one material selected from the group consisting of nitrides, oxides, sulfides, and fluorides of silicon, aluminum, zinc, magnesium, germanium, and titanium.

8. A medium according to claim 1, wherein said first protective layer is essentially made of zinc sulfide and silicon dioxide.

9. A method of recording/reproducing optical information, comprising recording marks having different lengths on grooves and lands and reproducing recorded information by irradiation of a recording light beam using an optical information recording medium having a structure obtained by sequentially stacking a transparent substrate having spiral or concentrical tracks made up of grooves and lands between the grooves, an interference layer containing at least one material selected from the group consisting of gold, silver, copper, silicon, and germanium, a first protective layer, a phase change recording layer having optical characteristics changeable due to change in atomic alignment by irradiation of a recording light beam, a second protective layer, and a reflective layer, wherein said transparent substrate has spiral or concentrical tracks made up of grooves having a depth of 0.14 to 0.2 $\lambda$/n or 0.25 to 0.4 $\lambda$/n and lands between the grooves, thickness of said interference layer and said first protective layer are adjusted to make reflectivity change amounts of the lands and the grooves close to each other, and a phase-changed portion and a phase-unchanged portion have a phase difference not more than ±45°.

10. A method according to claim 9, wherein the phase difference is not more than ±20°.

11. A method according to claim 9, wherein said interference layer contains at least one material selected from the group consisting of gold, silver, and copper and has a thickness not more than 200 Å, said first protective layer has a thickness of 0.2 to 0.45 ($\lambda$/n), said phase change recording layer is essentially made of GeSbTe and has a thickness not more than 350 Å, said second protective layer is essentially made of zinc sulfide and silicon dioxide and has a thickness of 0.04 to 0.4 ($\lambda$/n) or 0.52 to 0.92 ($\lambda$/n), and said reflective layer is essentially made of an alloy containing at least one of aluminum and gold and has a thickness not less than 100 Å.

12. A method according to claim 4, wherein said first protective layer has a thickness of 0.27 to 0.32 ($\lambda$/n).

13. A method according to claim 9, wherein said interference layer contains at least one of silicon and germanium and has a thickness of 400 Å to 750 Å, said first protective layer has a thickness of 0.3 to 0.5 ($\lambda$/n), said phase change recording layer is essentially made of GeSbTe and has a thickness not more than 350 Å, said second protective layer is essentially made of zinc sulfide and silicon dioxide and has a thickness of 0.04 to 0.4 ($\lambda$/n) or 0.52 to 0.92 ($\lambda$/n), and said reflective layer is essentially made of an alloy containing at least one of aluminum and gold and has a thickness not less than 100 Å.

14. A method according to claim 13, wherein said first protective layer has a thickness of 0.35 to 0.40 ($\lambda$/n).

15. A method according o claim 9, wherein said first protective layer is made of at least one material selected from the group consisting of nitrides, oxides, sulfides, and fluorides of silicon, aluminum, zinc, magnesium, germanium, and titanium.

16. A method according to claim 9, wherein said first protective layer is essentially made of zinc sulfide and silicon dioxide.

* * * * *